Nov. 3, 1964   W. A. THORNTON, JR   3,155,861
METHOD FOR OPERATING ELECTROLUMINESCENT DEVICE
Filed Feb. 8, 1961

INVENTOR.
WILLIAM A. THORNTON, Jr.
BY
W. D. Palmer
ATTORNEY.

United States Patent Office 3,155,861
Patented Nov. 3, 1964

3,155,861
METHOD FOR OPERATING ELECTRO-
LUMINESCENT DEVICE
William A. Thornton, Jr., Cranford, N.J., assignor to
Westinghouse Electric Corporation, East Pittsburgh,
Pa., a corporation of Pennsylvania
Filed Feb. 8, 1961, Ser. No. 87,816
6 Claims. (Cl. 313—108)

This invention relates to electroluminescent devices and, more particularly, to a method for storing luminous energy in an electroluminescent device for later release.

For some special applications it is desirable to be able to store luminous energy for later release. Memory devices are one type of such application. It is also desirable to store luminous energy and later release this stored energy with an enhanced output, such as for signal applications.

It is the general object of this invention to provide a method for operating an electroluminescent device so that luminous energy can be stored in the device for later release.

It is another object to provide a method for operating an electroluminescent device whereby luminous energy can be stored for later release with an enhanced output.

The aforesaid objects of the invention, and other objects which will become apparent as the description proceeds, are achieved by providing a method for operating an electroluminescent device whereby the electroluminescent phosphor, which is responsive to both an electric field and ultraviolet radiations in order to produce visible light, is first excited with ultraviolet radiations of predetermined intensity and simultaneously placed within an alternating electric field of predetermined intensity. Thereafter, the ultraviolet excitation is removed as is the applied electric field. Preferably the field is removed after the exciting ultraviolet, but in any case, the field is not removed before the ultraviolet excitation is removed. After a predetermined period, the phosphor is again excited with ultraviolet radiations of predetermined intensity. On this last excitation, energy which has been previously stored in the phosphor is released and the phosphor responds to the last ultraviolet excitation with an enhanced luminosity of relatively short duration.

For a better understanding of the invention, reference should be had to the accompanying drawings wherein.

Figure 1:
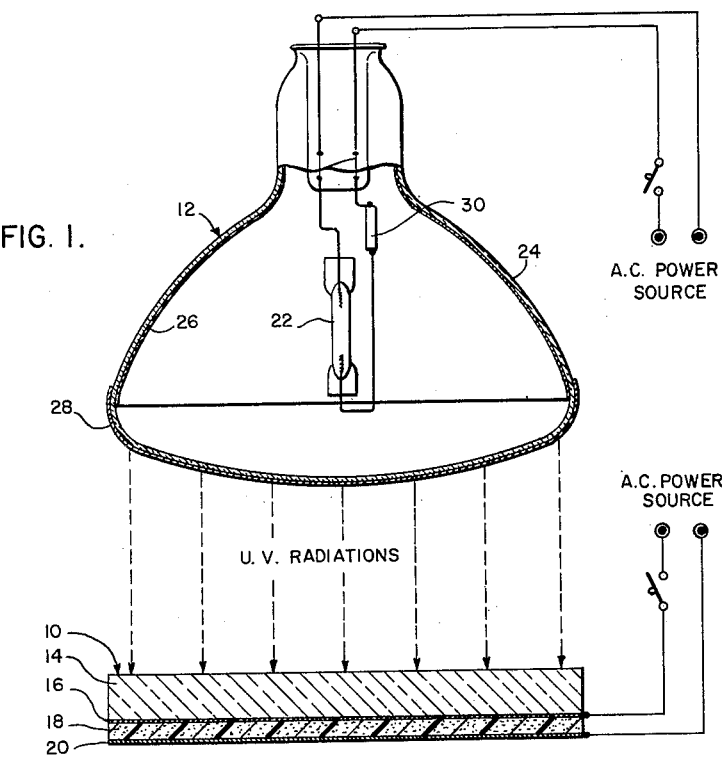
FIG. 1 is a sectional elevational view of an electroluminescent device adapted to be operated in accordance with the present method and including a separate ultraviolet-generating source which is operatively associated with the electroluminescent device to irradiate the phosphor portion thereof.
Figure 2:
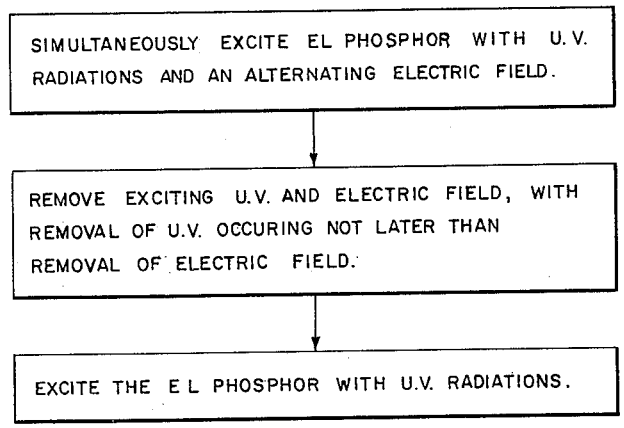
FIG. 2 is a flow diagram setting forth the steps of the present method.

With specific reference to the form of the invention illustrated in the drawings, in FIG. 1 is shown a conventional electroluminescent device or cell 10 which is adapted to be irradiated with ultraviolet energy from a conventional ultraviolet source 12. The electroluminescent cell 10 comprises a glass foundation 14 having coated thereon a radiation-transmitting, electrically conducting electrode layer 16 which is formed of tin oxide. Coated over the electrode layer 16 is a layer 18 comprising electroluminescent phosphor embedded in suitable dielectric material. Coated over the phosphor-dielectric layer 18 is a second electrode 20 which is formed of vacuum-metallized aluminum.

The electroluminescent cell 10 is generally conventional in construction and the tin oxide electrode 16 can be replaced by other radiation-transmitting, electrically conducting materials such as indium or titanium oxides, for example. The layer 18 comprising the phosphor is formed of any conventional finely divided electroluminescent phosphor embedded in a suitable radiation-transmitting dielectric such as polyvinyl chloride. The parts by weight of phosphor and dielectric can be varied considerably and as an example, equal parts by weight of phosphor and dielectric are used. The thickness of the phosphor-dielectric layer 18 is subject to considerable variation and as an example, the layer 18 has a thickness of two mils. The aluminum electrode 20 can be formed of other suitable electrode material such as copper iodide, which is light transmitting in nature. Alternative constructions are also possible for the cell 10 in that a separate layer of dielectric material can be interposed between the electrodes 16 and 20 or the dielectric can be dispensed with, if desired, and the finely divided phosphor embedded between the electrodes with no admixed dielectric. The phosphor can also be in the form of a continuous, thin phosphor film. A ceramic material can be substituted for the foregoing organic dielectric material, as is well known. In addition, the glass foundation 14 can be dispensed with, if desired, or glass foundations can be used on both sides of the electroluminescent device. Either or both of the electrodes 16 and 20 can be formed as a grid of wires or as an interlacing grid mesh with phosphor therebetween, such as disclosed in U.S. Patent No. 2,684,450, dated July 20, 1954.

The ultraviolet generating source 12 is of conventional construction and such sources are commercially available. The source 12 comprises a high-pressure, mercury-vapor arc tube 22 surrounded by a protecting envelope 24. A reflecting coating 26 is carried on a portion of the interior surface of the envelope 24. The face of the envelope 24 is provided with a conventional filter 28, which is adapted to pass only selected radiations. For the specific examples as described hereinafter, the filter 28 is adapted to pass only 3650 A.U. radiations in appreciable amounts. A conventional ballast 30 is required to limit the current through the arc tube 22.

Any electroluminescent phosphor can be used in the cell 10. The best electroluminescent phosphors developed to date incorporate zinc sulfide as matrix and include copper as activator. Other metals can be used to supplement the zinc sulfide in the matrix, such as cadmium and mercury. Other activators can be used to supplement the copper activator, such as manganese and lead. In addition, the sulphur portion of the matrix can be replaced in part or in whole by selenium, in order to produce zinc selenide-type phosphors. While the sulfide phosphors are the best electroluminescent phosphors known to date, other phosphors are also electroluminescent, such as some selected silicates for example. Such other phosphors can be substituted for the preferred sulfide-type phosphors when operating an electroluminescent device in accordance with the present method. Specific details for preparing electroluminescent phosphors are given in copending application S.N. 732,-510, filed May 2, 1958, and owned by the present assignee, now Patent No. 2,972,692.

The foregoing phosphors can be excited by both short-wave and longwave ultraviolet radiations, in order to produce visible light. Since the usual glass foundation which is used to support an electroluminescent device is quite transmissive to 3650 A.U. radiations, the ultraviolet source 12, as shown in FIG. 1, has been selected to produce such radiations. It should be understood, however, that if a grid-mesh electrode structure is used in the electroluminescent cell, the phosphor can be excited in accordance with the present method by an ultraviolet source which generates shorter wavelength ultraviolet radiations, such as those having a wavelength of 2537 A.U.

The electroluminescent device 10, as shown in FIG. 1, can be energized to visible luminescence either by the application of an alternating electric potential across the electrodes 16 and 20 or by exciting the phosphor in the layer 18 with ultravoilet radiations generated by the source 12. In the usual case, if both ultraviolet radiations and an alternating electric field are used to excite the phosphor simultaneously, there will be a slight quenching of light output over that light output which might be expected. In other words, the summation of the light emission resulting from field excitation per se and the light emission resulting from ultraviolet excitation per se is slightly greater than the light emission which results when the same ultraviolet radiations and electric field simultaneously excite the phosphor. Under special selected conditions, however, there may be some enhancement of light output when the phosphor is simultaneously energized by ultraviolet radiations and an electric field.

In accordance with the present method, the phosphor in the layer 18 is first excited with ultraviolet radiations, as generated by the source 12, and simultaneously an alternating electric potential is applied across the electrodes 16 and 20 to impress an alternating electric field of predetermined intensity across the phosphor of the layer 18. Thereafter, the ultraviolet excitation of the phosphor is stopped and the application of the alternating electric potential across the electrodes 16 and 20 is continued. The application of the potential across the electrodes 16 and 20 is then discontinued. The phosphor is then irradiated with ultraviolet by energizing the source 12. Immediately upon such irradiation, the phosphor responds with an enhanced luminosity of relatively short duration.

As a specific example, the alternating electric potential which is applied across the electrodes 16 and 20 of the device 10 has a value of 110 volts, 60 cycles. The resulting field has an intensity of 50 volts per mil. The intensity of the ultraviolet radiations which are used to excite the phosphor is not particularly critical and, as an example can be varied over a wide range such as from about 0.1 to about 1,000 microwatts per cm.$^2$. As a specific example, the ultraviolet radiations have an intensity of about 200 microwatts per cm.$^2$. The phosphor is simultaneously excited to visible light output by the foregoing specific ultraviolet and field excitations for a period of one minute. Thereafter, the ultraviolet excitation is removed and the alternating electric field excitation continued for another ten seconds. The phosphor is then allowed to remain quiescent for a total period of approximately 30 seconds. The foregoing specific ultraviolet radiations are then applied to excite the phosphor for a period of thirty seconds. Immediately upon the last excitation by the ultraviolet radiations, the phosphor responds with a luminous response which is 50% to 60% brighter than that brightness obtained when exciting an "unsensitized" phosphor with ultraviolet radiations of the same intensity. This phosphor brightness decays gradually through a period of about 30 seconds to its original equilibrium value, that is, that value of brightness which is normally obtained when the phosphor is excited only with such ultraviolet radiations.

The foregoing specific example is subject to considerable modification. To illustrate, the ultraviolet and field excitation can be removed simultaneously and energy will be stored in the phosphor. In any case, however, during the initial ultraviolet and field excitation of the phosphor, the ultraviolet excitation should not be removed after the electric field is removed. The period required to store the energy in the phosphor during the initial excitation is in no way critical and a very short initial excitation period, such as one second for example, is sufficient to store the luminous energy in the phosphor. The time interval between the removal of the electric field from across the phosphor to the last phosphor ultraviolet excitation can be extended or shortened. The longer such time interval, however, the less the enhancement of the resulting luminous signal. In addition, the specific respective values of ultraviolet radiation intensity and electric field intensity are subject to considerable variation and do not appear to be particularly critical. Excellent results have been obtained when the ultraviolet radiations and electric fields have such relative predetermined intensities that approximately equal light outputs are produced when the phosphor is excited solely by such ultraviolet radiations and solely by such alternating electric fields. It should be understood, however, that the relative intensities of the ultraviolet radiations and the exciting electric field can be varied considerably. In the case the light intensity obtained when the phosphor is excited solely with the ultraviolet radiations is considerably stronger than the light intensity which is obtained when the phosphor is excited solely by the electric field, there will be less storage of luminous energy when practicing the present method. If the reverse is true, that is, if the light emission intensity resulting from field excitation per se is considerably greater than the light emission intensity resulting from the ultraviolet excitation per se, then again the storage effects will not be as great when practicing the present method. However, the present storage and enhanced output effects will normally be present to some degree for any reasonable relative values of utlraviolet radiation intensity and electric field intensity. As a practical matter, the intensities of the predetermined ultraviolet excitation and the predetermined electric field excitation should be such that each is capable of exciting the phosphor to visible light emission.

It will be recognized that the objects of the invention have been achieved by providing a method for operating an electroluminescent device so that luminous energy can be stored in the device for later release. This method permits the luminous energy to be stored and later released with an enhanced output.

While a best embodiment of the invention has been illustrated and described in detail, it is to be particularly understood that the invention is not limited thereto or thereby.

I claim:

1. The method of storing luminous energy in ultraviolet-responsive and electroluminescent phosphor for later release, which method comprises, first simultaneously exciting said phosphor with ultraviolet radiations of predetermined intensity and an alternating electric field of predetermined intensity, removing said exciting ultraviolet radiations and said alternating electric field with removal of said ultraviolet radiations occurring not later than removal of said alternating electric field, and after a predetermined period exciting said phosphor with ultraviolet radiations of predetermined intensity.

2. The method of storing luminous energy in ultraviolet-responsive and electroluminescent phosphor for later release with enhanced luminosity, which method comprises, first simultaneously exciting said phoshor to visible light output with ultraviolet radiations of predetermined intensity and an alternating electric field of predetermined intensity, removing said exciting ultraviolet radiations and said alternating electric field with removal of said ultraviolet radiations occurring not later than removal of said alternating electric field and after a predetermined period exciting said phosphor with ultraviolet radiations of predetermined intensity, whereby on such last ultraviolet excitation, the phosphor responds with an enhanced luminosity of short duration.

3. The method of storing luminous energy in ultraviolet-excitable and electroluminescent phosphor for later release, which method comprises, first exciting said phosphor with ultraviolet radiations of predetermined intensity and simultaneously applying an alternating electric field of predetermined intensity across said phosphor, removing said ultraviolet excitation while maintaining the application of said alternating electric field across said phosphor, removing said alternating electric field from across said phosphor, and after a predetermined period exciting said phosphor with ultraviolet radiations of predetermined intensity.

4. The method of storing luminous energy in ultraviolet-excitable and electroluminescent zinc sulfide type phosphor for later release, which method comprises, first exciting said phosphor with ultraviolet radiations of predetermined intensity and simultaneously applying an alternating electric field of predetermined intensity across said phosphor, removing said ultraviolet excitation while maintaining the application of said alternating electric field across said phosphor, removing said alternating electric field from across said phosphor, and after a predetermined period exciting said phosphor with ultraviolet radiations of predetermined intensity, whereby when last excited by ultraviolet radiations, the phosphor responds with an enhanced luminosity of short duration.

5. The method of storing luminous energy in ultraviolet-excitable and electroluminescent zinc sulfide type phosphor for later release, which method comprises, first exciting said phosphor with 3650 A.U. ultraviolet radiations of predetermined intensity and simultaneously applying an alternating electric field of predetermined intensity across said phosphor, removing said ultraviolet excitation while maintaining the application of said alternating electric field across said phosphor, removing said alternating electric field from across said phosphor, and after a predetermined period exciting said phosphor with ultraviolet radiations of predetermined intensity, whereby when last excited by ultraviolet radiations, the phosphor responds with an enhanced luminosity of short duration.

6. The method of storing luminous energy in utraviolet-excitable and electroluminescent phosphor for later release, which method comprises, first exciting said phosphor with ultraviolet radiations of sufficient intensity to generate visible light and simultaneously applying across said phosphor an alternating electric field of sufficient intensity to generate visible light, removing said ultraviolet excitation while maintaining the application of said alternating electric field across said phosphor, removing said alternating electric field from across said phosphor, and after a predetermined period again exciting said phosphor with said ultraviolet radiations, whereby when last excited by said ultraviolet radiations, the phosphor responds with an enhanced luminosity of short duration.

References Cited in the file of this patent

UNITED STATES PATENTS

| | | |
|---|---|---|
| 2,742,631 | Rajchman | Apr. 17, 1952 |
| 2,885,560 | Destriau | May 5, 1959 |
| 2,939,029 | Wahlig | May 31, 1960 |